(12) United States Patent
Dave et al.

(10) Patent No.: US 12,278,902 B1
(45) Date of Patent: Apr. 15, 2025

(54) AUTHENTICATION IN METAVERSE

(71) Applicant: Wells Fargo Bank, N.A., San Francisco, CA (US)

(72) Inventors: Aparna M. Dave, Houston, TX (US); Tammy Renee Kiser, Cornelius, NC (US); Craig Moore, St. Louis, MO (US); Paul W. Mussell, Minneapolis, MN (US)

(73) Assignee: Wells Fargo Bank, N.A., San Francisco, CA (US)

( * ) Notice: Subject to any disclaimer, the term of this patent is extended or adjusted under 35 U.S.C. 154(b) by 262 days.

(21) Appl. No.: 18/149,900

(22) Filed: Jan. 4, 2023

(51) Int. Cl.
*H04L 9/32* (2006.01)
*G06T 17/00* (2006.01)
*G06V 40/20* (2022.01)

(52) U.S. Cl.
CPC .............. *H04L 9/321* (2013.01); *G06T 17/00* (2013.01); *G06V 40/20* (2022.01)

(58) Field of Classification Search
CPC ...... H04L 47/828; H04L 47/748; H04L 47/83
See application file for complete search history.

(56) References Cited

U.S. PATENT DOCUMENTS

| | | | | |
|---|---|---|---|---|
| 11,665,161 | B2 * | 5/2023 | Alexander | H04L 63/0884 726/5 |
| 2009/0007250 | A1 * | 1/2009 | Pouzin | H04L 9/3213 726/10 |
| 2017/0080346 | A1 * | 3/2017 | Abbas | A63F 13/79 |
| 2019/0377417 | A1 * | 12/2019 | Friedman | H04L 63/0861 |
| 2022/0116227 | A1 * | 4/2022 | Choi | G06Q 20/4015 |
| 2022/0156803 | A1 * | 5/2022 | Sylvester | G06Q 30/018 |

FOREIGN PATENT DOCUMENTS

| | | |
|---|---|---|
| KR | 102317223 B1 | 10/2021 |
| KR | 102415719 B1 | 7/2022 |

OTHER PUBLICATIONS

"Multi-Factor Authentication and the Metaverse", Identiv.com, https://www.identiv.com/community/2022/03/01/s1e2-multi-factor-authentication-and-the-metaverse-1423/, Mar. 1, 2022, 7 pages.
U.S. Appl. No. 18/149,757, filed Jan. 4, 2023 entitled Authentication in Metaverse.

* cited by examiner

*Primary Examiner* — Joe Chacko
(74) *Attorney, Agent, or Firm* — Merchant & Gould P.C.

(57) ABSTRACT

An example computer system for authenticating a user in a metaverse can include one or more processors; and non-transitory computer-readable storage media encoding instructions which, when executed by the one or more processors, causes the computer system to: receive an authentication credential from the user; determine whether the authentication credential is valid; upon determining that the authentication credential is valid, update authentication status of the user; and maintain the authentication status of the user across multiple login attempts by the user.

14 Claims, 4 Drawing Sheets

AUTHENTICATION IN METAVERSE

BACKGROUND

The metaverse can be envisioned as an immersive world that is typically facilitated through the use of virtual and augmented reality devices. The metaverse can include a virtual representation of most, if not all, aspects of the physical work in which we live. Certain aspects of metaverse activities can require authentication. This can be challenging given the decentralized nature of the electronic world.

SUMMARY

Examples provided herein are directed to authentication in the metaverse.

According to one aspect, an example computer system for authenticating a user in a metaverse includes: one or more processors; and non-transitory computer-readable storage media encoding instructions which, when executed by the one or more processors, causes the computer system to: receive an authentication credential from the user; determine whether the authentication credential is valid; upon determining that the authentication credential is valid, update authentication status of the user; and maintain the authentication status of the user across multiple login attempts by the user.

According to another aspect, an example method for authenticating a user in a metaverse includes: receiving an authentication credential from the user; determining whether the authentication credential is valid; upon determining that the authentication credential is valid, updating authentication status of the user; and maintaining the authentication status of the user across multiple login attempts by the user.

According to yet another aspect, an example computer system for authenticating a user in a metaverse includes: one or more processors; and non-transitory computer-readable storage media encoding instructions which, when executed by the one or more processors, causes the computer system to: receive an authentication credential from the user; determine whether the authentication credential is valid; upon determining that the authentication credential is valid, update authentication status of the user; and maintain, using a trusted party within the metaverse, the authentication status of the user across multiple login attempts by the user, wherein maintaining the authentication status includes: continuously monitoring for outlier behavior associated with a user profile of the user across the metaverse; upon identifying the outlier behavior associated with the user within the metaverse, triggering the trusted entity to perform a heightened authentication process.

The details of one or more techniques are set forth in the accompanying drawings and the description below. Other features, objects, and advantages of these techniques will be apparent from the description, drawings, and claims.

DETAILED DESCRIPTION

This disclosure relates to authentication in the metaverse.

Virtual environments, including the metaverse, are accessible to anyone with an Internet connection. The metaverse provides anonymity, but anonymity presents a significant risk of fraud when transacting assets having real-world value. Without being able to identify users in virtual spaces, entities and other parties to a transaction cannot verify whether a user has authority to sell/exchange assets or whether the user has sufficient monetary resources to pay for assets.

Therefore, it can be desirable to authenticate an individual when performing certain activities in the metaverse. Such activities can include, without limitation, financial services like banking. For example, a user in the metaverse may need to be authenticated to allow for access to banking features, such as Automated Teller Machine (ATM) or branch visits, etc. A user may also have to be authenticated in the metaverse to conduct economic exchanges, such as buying and selling of goods and/or services within the metaverse.

The metaverse may include different types of entities that may require and/or benefit from user authentication. However, not all entities may be capable of authenticating a user. In addition, the authentication of a user by an entity may not always be trusted by other entities, unless the entity has garnered trust from users in the real-world and within the metaverse. A trusted entity is an entity is such an entity that has garnered trust from users and other entities in the real-world and within the metaverse. Without being authenticated by a trusted entity, the user may need to be authenticated over and over again whenever the user interacts with a new entity within the metaverse, which may impact the user experience within the metaverse.

While different entities may have the capability to authenticate a user, few entities are as trusted as a financial institution that deals with financial transactions due to the high level of sensitivity associated with financial transactions. Authentication of a user by a trusted entity, such as a financial institution, may carry a credibility across all entities within a metaverse. Therefore, the trusted entity may offer authentication as a service.

For example, a trusted entity, such as the financial institution, may provide an authentication service that can be leveraged by other entities within the metaverse. In addition, the authentication service provided by the trusted entity may also identify outlier behavior of a particular user profile across metaverses and mitigate potential impersonations and trigger the trusted entity to perform a heightened authentication process, such a multi-factor authentication or single-factor authentication, in order to ensure the legitimacy of the user profile.

Based on the secure authentication provided by the authentication service, a user may not need to undergo authentication operations for accessing specific services or locations within the metaverse. For instance, since once authenticated, a user within the metaverse can be trusted as a representative of a known person from the real-world, the user may be granted permission to take every action within the metaverse that the known person is authorized to make in the real-world without requiring separate and/or additional authentication operations.

There can be various advantages associated with the technologies described herein. For instance, the authentication techniques described herein provides a trusted authentication service that authenticates a user's identity within a virtual environment, such as the multiverse, where other entities and users may rely on the authentication provided by the trusted authentication service.

The described techniques result in an improvement of the metaverse technology by not requiring authentication of the user multiple times throughout the user's session. The authentication techniques described herein can also increase the security and robustness of the metaverse. The described authentication techniques therefore result in an improvement of the metaverse technology, such as by providing fraud-prevention, and therefore result in a practical application.

Figure 1:
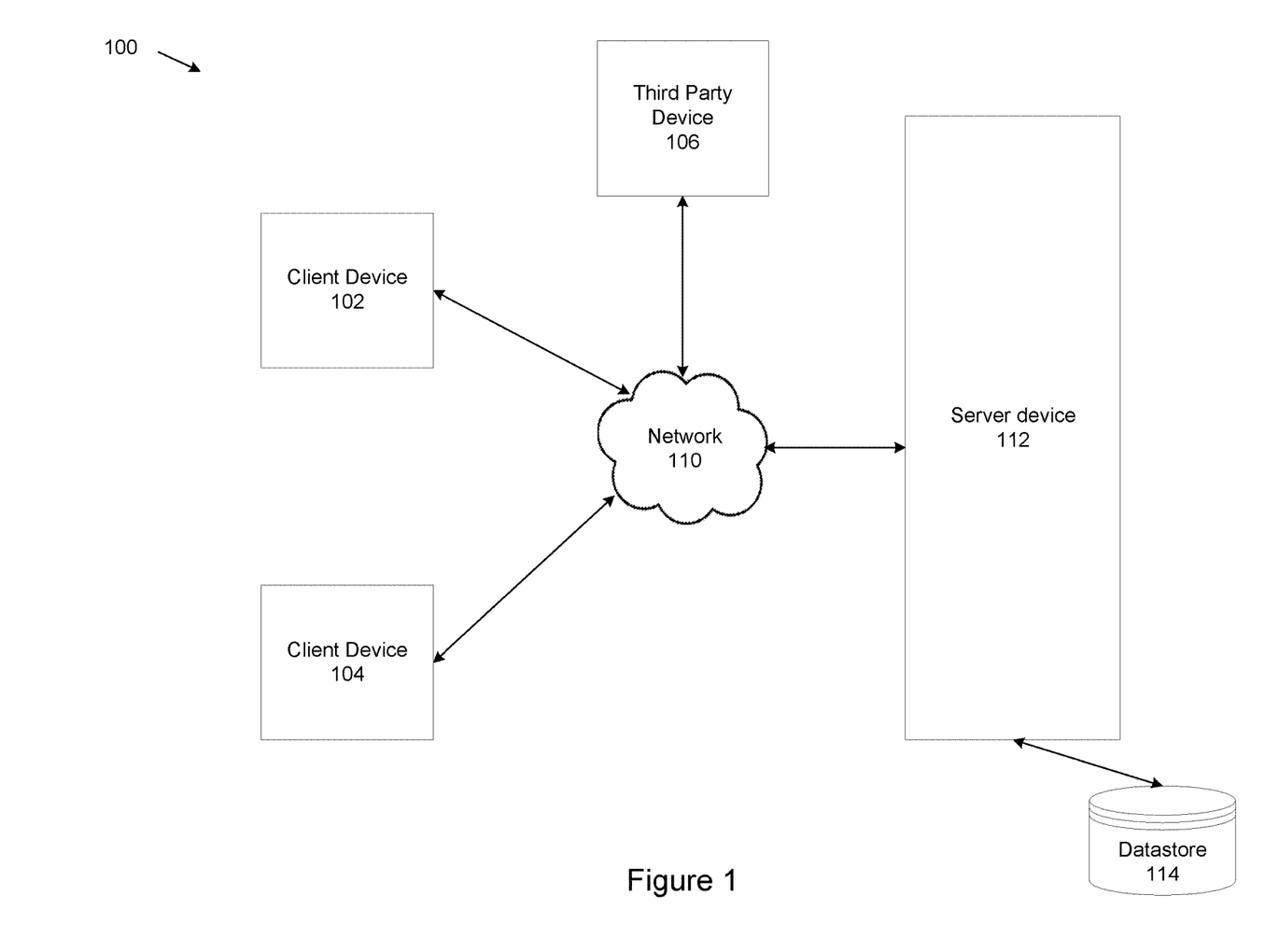
FIG. 1 shows an example system for authenticating a user in the metaverse.

FIG. 1 schematically shows aspects of one example system 100 programmed to authenticate an individual in the metaverse. In this example, the system 100 can be a computing environment that includes a plurality of client and server devices. In this instance, the system 100 includes client devices 102, 104, a third party device 106, and a server device 112. The client devices 102, 104, the third party device 106, and the server device 112 can communicate through a network 110 to accomplish the functionality described herein.

Each of the devices may be implemented as one or more computing devices with at least one processor and memory. Example computing devices include a mobile computer, a desktop computer, a server computer, or other computing device or devices such as a server farm or cloud computing used to generate or receive data.

For instance, in some examples, the client devices 102, 104 are virtual and/or augmented reality devices that provide access to a metaverse in which individuals can interact. The metaverse can be an immersive world that is facilitated through the use of the virtual and augmented reality devices. Examples of such devices include virtual and/or augmented reality headsets that provide a three-dimensional experience associated with the metaverse, such as: Google Glass, Microsoft Halo, Meta Quest, Sony PlayStation VR, Valve Index VR, HTC Vive Pro, or HP Reverb.

In some examples, an individual can enter and interact within the metaverse using a virtual representation of themselves. This representation is referred to as an avatar, which is an icon or figure representing the individual. The avatar can be used to interact within the metaverse and can have certain preferences, settings, and options associated therewith.

The example client devices 102, 104 are programmed to access and interact within the metaverse. This interaction can include many different types of activities, such as social media interactions, gaming, and business-related activities. In the examples provided herein, the activities can also include activities related to financial services. These financial services can include, without limitation, making purchases, accessing money such as by making deposits and withdrawals from checking, saving, and/or money market accounts, loan procurements, and any other types of banking functions. Many other configurations are possible.

In this example, the third party device 106 facilitates the creation of the metaverse. For instance, the client devices 102, 104 can communicate with the third party device 106 to enter and interact in the metaverse hosted by the third party device 106.

In example embodiments, the third party device 106 can be a cloud-based platform that allows devices (e.g., client device 102, 104) to connected thereto to access the metaverse. Non-limiting examples of metaverse platforms include Decentraland from The Decentraland Foundation and Sandbox from TSB Gaming Ltd. Many other existing and future metaverses are also applicable.

In some non-limiting examples, the server device 112 is maintained by a trusted entity such. A trusted entity is an entity is such an entity that has garnered trust from users and other entities in the real-world and within the metaverse, such as a financial institution. The client devices 102, 104 can be programmed to communicate with the server device 112 to provide financial services within the metaverse. Examples of such financial services include, without limitation, making purchases, accessing money such as by making deposits and withdrawals from checking, saving, and/or money market accounts, and any other types of banking functions.

The example server device 112 is further programmed to provide one or more of the authentication techniques described herein. Additional details of these techniques are provided below.

The example datastore 114 may include one or more electronic databases that can store data related to one or more logical components of the server device 112. The datastore 114 may be maintained by the same entity that maintains the server device 112 or one or more external enterprises associated with the entity that maintains the server device 112. The datastore 114 can be accessed by the server device 112 to retrieve relevant data associated with the server device 112.

The network 110 provides a wired and/or wireless connection between the client devices 102, 104, the third-party device 106, and the server device 112. In some examples, the network 110 can be a local area network, a wide area network, the Internet, or a mixture thereof. Many different communication protocols can be used. Although only three devices are shown, the system 100 can accommodate hundreds of, thousands of, or more computing devices.

Figure 2:
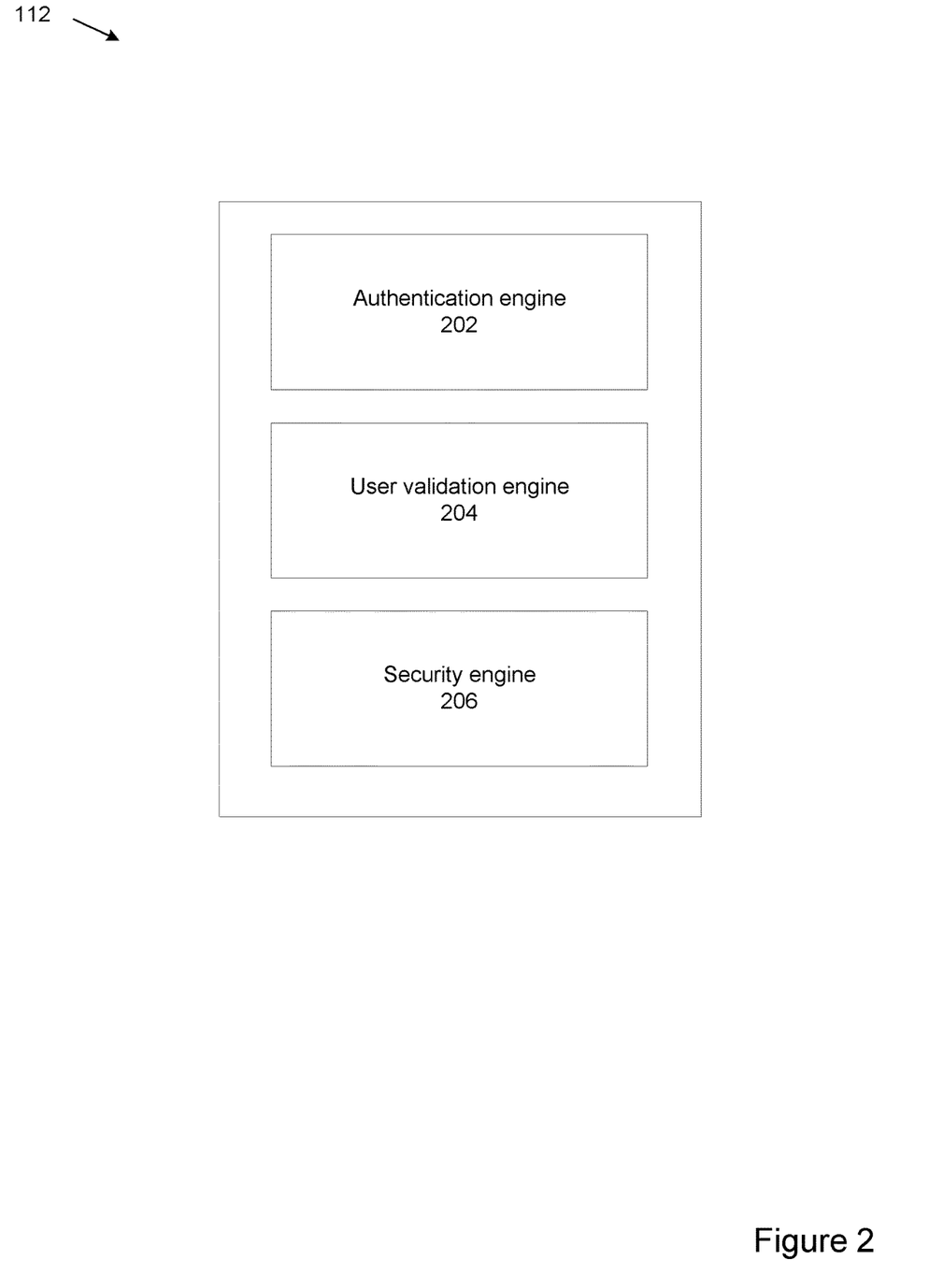
FIG. 2 shows example logical components of a server device of the system of FIG. 1.

Referring now to FIG. 2, additional details of the server device 112 are shown. In this example, the server device 112 has various logical modules that assist in authentication in the metaverse. The server device 112 can, in this instance, include an authentication engine 202, a user validation engine 204 and a security engine 206. In other examples, more or fewer engines providing different functionality can be used.

The example authentication engine 202 can be configured to authenticate a user within the metaverse. In some examples, the authentication engine 202 may authenticate the identity of the user when the user initially logs in to the metaverse. For example, during the log in process for the metaverse, the user may be provided with an option to continue logging in using the credentials for the metaverse or an option to login to the metaverse as an authenticated user. Upon the user selecting the option to login to the metaverse as an authenticated user, the user may be redirected to an authentication process provided by the authentication engine 202.

In other examples, the authentication engine 202 may authenticate the user upon the avatar of the user approaching a virtual entity within the metaverse, wherein the virtual entity is maintained by the same trusted entity that maintained the server device 112 in the real-world. In a non-limiting example, a real-world trusted entity, such as a financial institution, may provide a virtual representation of the real-world trusted entity, such as a virtual financial institution, within the metaverse.

Users who desire to get authenticated in order to obtain permission to access certain locations within the metaverse, interact with certain entities and/or users within the metaverse or conduct certain transactions within the metaverse may use their avatars to approach the virtual representation of the trusted entity in order to initiate the authentication process. For example, the avatar of the user may be manipulated by the user to request authentication by the trusted entity within the metaverse. Once the avatar of the user initiates the authentication process, the authentication engine 202 may be configured to authenticate the identity of the user.

The authentication engine 202 may be configured to authenticate the user by requesting authentication credentials from the user. Upon receiving authentication credentials from the user, the authentication engine 2002 may verify the validity of the authentication credentials by comparing the received authentication credentials against valid credentials stored in the datastore 114 associated with the server device 112. Other ways of validating the received authentication credentials are also possible.

In some examples, the authentication credentials may include a username and password. In other examples, the authentication credentials can include a username and a pass phrase followed by one or more security questions, voice recording of a particular word or phrase from the user or a biometric scan of one or more features associated with the user, such as fingerprint scan, facial scan, etc. In yet other examples, the authentication credential can include multi-factor authentication. An example of the multi-factor authentication credentials can include a one-time password sent to the user from the server device 112.

Upon verifying the identity of the user based on the authentication credentials, the authentication engine 202 may interface with the user validation engine 204 to indicate that profile and associated avatar have been verified as being associated with the particular user from the real-world.

The user validation engine 204 is configured to provide an indication that the identity of a user within the metaverse has been authenticated. The indication regarding the authentication of the identity of the user may be included within a user profile and/or with the avatar associated with user.

For example, each user within the metaverse may be associated with a user profile that includes information related to the user. The user profile can include information such as the name of the user, biographical information associated with the user, contact information associated with the user, financial information, such as bank account information, associated with the user.

For example, when the user validation engine 204 receives confirmation from the authentication engine 202 that the authentication engine 202 successfully verified the identity of the user, the user validation engine 204 may update the user profile and or the avatar associated with the user to indicate that the user has been authenticated by a trusted entity.

In one example, the user validation engine 204 may update an authentication status associated with the profile of the user in order to indicate to third parties that the user is authenticated. The authentication status may be a setting associated with the profile of the user that indicates whether the user has been authenticated by a trusted entity or not. For example, when a user enters a location within the metaverse or a transaction within the metaverse that requires the identity of the user be authenticated prior to entering the location or the transaction, the authentication status of the user may be verified by the secondary party requiring that the user be authenticated by checking the authentication setting on the profile of the user.

In some examples, the secondary party may be an entity or another user that is a party to a transaction with the user. In other examples, the secondary party may be a module associated with the metaverse itself that controls access to particular locations within the metaverse. In such examples, the secondary party may verify that the user has indeed been authenticated by checking the authentication status included within the profile of the user.

Each user within the metaverse may also be associated with an avatar that may interact with different virtual entities and other avatars within the metaverse. The avatar of the user can have certain preferences, settings, and options associated therewith as well.

For example, the avatar can be customized by the user to include features based on the user's preferences. In one example, the avatar can be customized to display certain information related to the user adjacent to the avatar as the avatar moves through the metaverse. For example, the user may select that the user's name or username be displayed adjacent to the avatar of the user so that third parties may immediately be able to identify the user. In addition, the user may also select whether the authentication status of the user be displayed adjacent to or integrated with the avatar.

In some examples, the user may select to display the authentication status adjacent to or integrated with the avatar at all times or during certain times, such as when the avatar of the enters certain locations within the metaverse, when the avatar of the user is interacting with certain entities or other users, during certain times of the day, etc. The authentication status may be displayed as a text or may be displayed as a visual feature associated with the avatar. In other examples, the user may select to keep the authentication status information private and not display the authentication status visibly for other entities and users.

For example, if the authentication status is displayed as text, when a user has been authenticated by the authentication engine 202, the user validation engine 204 may display the word "authenticated" or "verified" adjacent to the avatar as the avatar moves through the metaverse. When a user has not been authenticated by the authentication engine 202, the user validation engine 204 may display the text "not authenticated" or "not verified" adjacent to the avatar or the user validation engine 204 my not display any text associated with the authentication status adjacent to the avatar.

If the authentication is displayed as a visual feature, then when the user has been authenticated by the authentication engine 202, the user validation engine 204 may display a visual feature, such as an icon or character adjacent to the avatar or the user validation engine 204 may display a visual feature, such as a halo around the head of the avatar. Other ways of integrating a visual feature, such as an object, a change in color, etc. within the avatar to indicate the authentication status of the avatar is also possible. When a user has not been authenticated by the authentication engine 202, the user validation engine 204 may display different visual features or no distinguishable visual features adjacent to or integrated with the avatar that is associated with authentication status.

The security engine 206 may be configured to continuously or periodically monitor the activities associated with the user within the metaverse in order to detect any fraudulent activity that would affect the authentication status of the user. For example, the security engine 206 may continuously or at periodic intervals monitor whether multiple avatars associated with the same user profile are participating in interactions and/or transactions within the same or other metaverses at the same time or within a small interval of time, such as within the same minute.

Upon identifying such a situation, the security engine 206 may tag the behavior as an outlier. The security engine 206 may also continuously or periodically monitor whether the same user profile is logged into and/or actively conducting transactions and interactions within multiple metaverses or at multiple locations within the same metaverse and upon identifying such a situation, may also tag the behavior as an outlier.

When the security engine 206 identifies an outlier behavior, the security engine 206 may respond in one or more of the following ways. For example, the security engine 206 may cause the user profile associated with the outlier behavior to automatically be logged out of the metaverse, thus forcing the user to re-authenticate themselves before continuing the metaverse session. The security engine 206 may also immediately update the authentication status of the user to note that the user is no longer authenticated or verified. The security engine 206 may also send out an alert to the client device 102 in order to alert the user of a potential impersonation.

The security device 206 may also interface with the authentication engine 202 to cause the authentication engine 202 to require the user to re-authenticate themselves. In some examples, the authentication engine 202 may simply require the user to re-authenticate themselves with the authentication credentials previously used by the user to get authenticated. In other examples, the authentication engine 202 may elevate the requirements for the user to get authenticated. For example, when the security engine 206 flags a potential impersonation or outlier behavior, the authentication engine 202 that typically only requires a username and password, may now require multi-factor authentication or require the user to answer one or more security questions currently in order to retain the authentication status of an authenticated user. Example systems and methods of determining outlier behavior and/or authenticating a user personal are also described in U.S. patent application Ser. No. 18/149,757 filed on Jan. 4, 2023, the entirety of which is hereby incorporated by reference.

Figure 3:
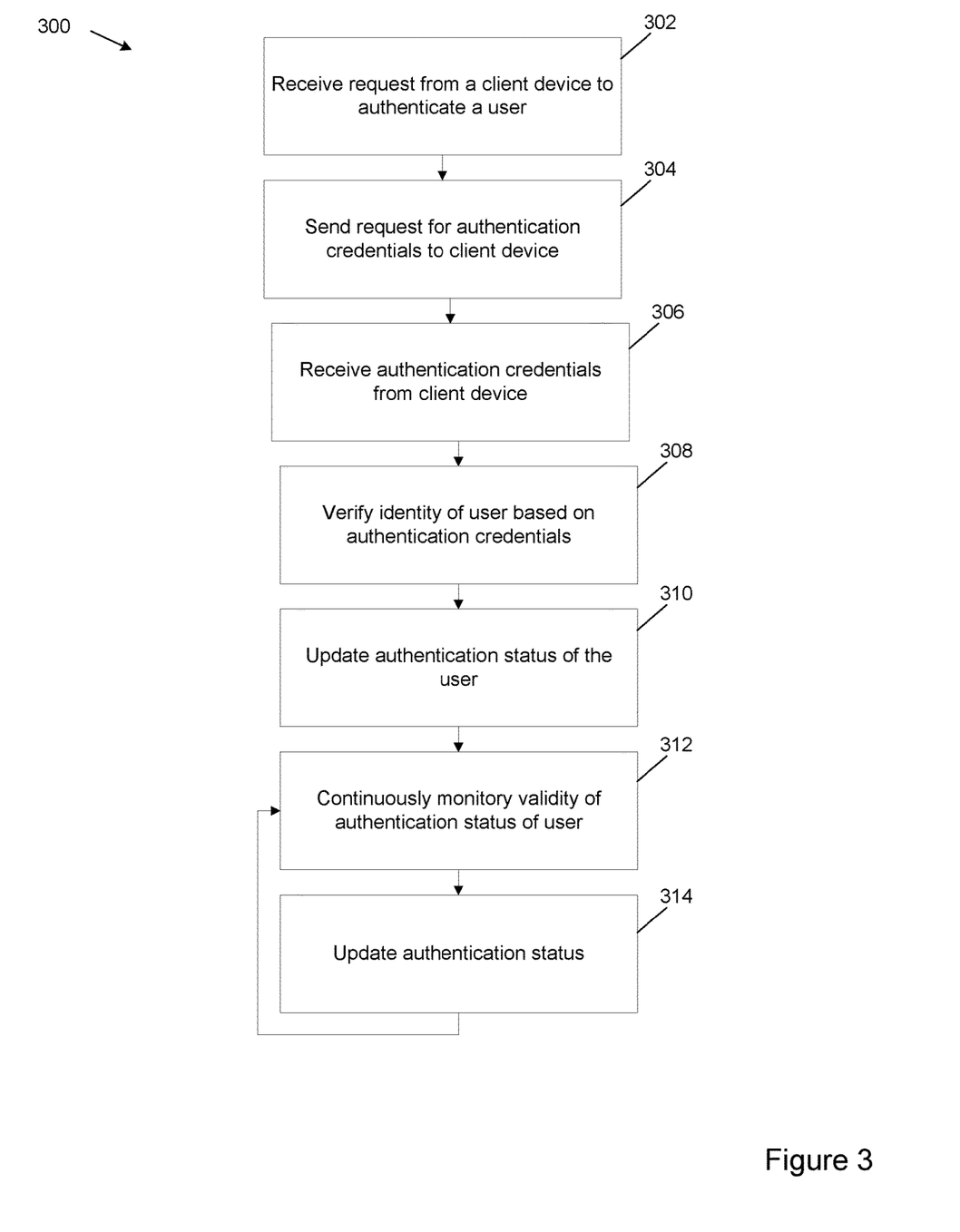
FIG. 3 shows an example method implemented by the server device of FIG. 2.

FIG. 3 shows an example method 300 for providing authentication as described herein. In some examples, the server device 112 performs the method 300.

At operation 302 of the method 300, the authentication engine 202 of the server device 212 receives a request from a client device 102 to authenticate a user at the client device 102. In one example, when logging in to the metaverse from the client device 102, a user may be presented with the option to get authenticated by the trusted entity that maintains the server device 112 in addition to logging in to the metaverse. If a user chooses the option to get authenticated by the trusted entity, the client device 102 may send and the server device 112 may receive a request to authenticate the user.

In other examples, the user may choose to get authenticated by the trusted user after the user has already logged in to the metaverse. For example, the user may manipulate the avatar associated with the user in the metaverse to approach an authentication service provided by the trusted entity to get authenticated. If the user is interested in getting authenticated by the trusted entity, the avatar of the user may make a request to get authenticated at the virtual representation of the trusted entity within the metaverse, and the server device 112, which is also associated with the trusted entity, may receive the request.

At operation 304, the authentication engine 202 may send a request to the client device 102 for the user to provide their authentication credentials to continue with the authentication process. For example, upon receiving a request to get authenticated by the trusted entity in operation 302, the authentication engine 202 of the server device 112 may send a request to be displayed on the client device 102 for the user at the client device 102 to provide authentication credentials associated with the trusted entity.

In some examples, the authentication credentials may include a username and password associated with the trusted entity. In other examples, the authentication credentials can include a username and a password followed by one or more security questions, voice recording of a particular word or phrase from the user or a biometric scan of one or more features associated with the user, such as fingerprint scan, facial scan, etc. In yet other examples, the authentication credential can include multi-factor authentication.

At operation 306, the authentication engine 202 may receive the authentication credentials provided by the user via the client device 102. For example, the user may, using a display screen or one or more other input/output interface of the client device 102 provide authentication credentials. The client device 102 may receive the authentication credentials from the user and send the authentication credentials to the server device 112, wherein the server device 112 may receive the authentication credentials from the client device 102.

At operation 308, the authentication engine 202 may verify the identity of the user based on the received authentication credentials. For example, the authentication engine 202 of the server device 112 may compare the authentication credentials received from the client device 102 in operation 306 and compare the received authentication credentials against the valid credentials stored in the datastore 114 associated with the server device 112.

If the authentication credentials received from the client device 102 in operation 306 matched the valid credentials stored in the datastore 114 associated with the service device 112, then the authentication engine 202 determines that the user profile and/or avatar attempting to get authenticated has been verified as belonging to a particular user from the real-world. If the authentication credentials received from the client device 102 in operation 306 did not match the valid credentials stored in the datastore 114 associated with the server device 112, then the authentication engine 202 determines that the user profile and/or avatar attempting to get authenticated has not been verified as belonging to a particular user from the real-world.

At operation 310, the user validation engine 204 updates the authentication status of the user. For example, the profile associated with the user within the metaverse may include an authentication status setting. If the authentication engine 202, in operation 308, determined that the that the user profile and/or avatar attempting to get authenticated has been verified as belonging to a particular user from the real-world, the user validation engine 204 may update the authentication status as "authenticated" or "verified." If the authentication engine 202, in operation 308, determined that the that the user profile and/or avatar attempting to get authenticated has not been verified as belonging to a particular user from the real-world, the user validation engine 204 may update the authentication status as "not authenticated" or "not verified."

In some examples, the authentication status may simply be a setting associated with the profile of the user that can then be used by the metaverse itself or third-party entities and users within the metaverse to verify whether the user profile and/or avatar within the metaverse in fact has been authenticated as belonging to the user from the real-world associated with the user profile and/or avatar.

In other examples, the authentication status may also be included as a textual or visual indicator associated with the avatar of the user such that the other entities and users within the metaverse can instantly identify the avatar as being associated with an authenticated user. Depending on the preferences of the user, the user may choose to openly display the authentication status adjacent to or integrated with the avatar for all or a subset of users to view or the user may choose to keep the authentication status private, wherein the authentication status information of the user is only shared with a third-party entity or user upon the user granting permission.

Operations 312 and 314 may be cyclically performed repeatedly during the length of the session during which the user is logged in to the metaverse. At operation 312, the security engine 206 may continuously or periodically at regular intervals monitor the validity of the authentication status. For example, the security engine 206 may continuously or periodically monitor the activities associated with a user profile within the metaverse in order to detect any fraudulent activity that would affect the validity of the authentication status of the user.

In one example, the security engine 206 may determine whether user profile is involved in any activities that may indicate fraudulence. For example, upon determining that multiple avatars are tied to the same user profile and each of the multiple avatars are associated with the same user profile are participating in interactions and/or transactions within the same or other metaverses concurrently or within a small window of time, the security engine 206 may tag the user profile as exhibiting potentially outlier behavior. In another example, upon determining that the same user profile is logged into and/or actively conducting transactions and interactions within multiple metaverses or at multiple locations within the same metaverse concurrently or within a small window of time, the security engine 206 may tag the user profile as exhibiting potentially outlier behavior.

At operation 314, the security engine 206 may update the authentication status of the user. In some examples, when the security engine 206 identifies a potentially outlier behavior in operation 312, the security engine 206 may immediately change the authentication status of the user to "not authenticated" or "not verified."

In other examples, the security engine 206 may wait to change the authentication status until the security engine 206 attempts to re-verify the validity of the authentication status of the user by requiring that the user re-authenticate themselves. In such a case, the security engine 205 may send a request for authentication credentials to the client device 102 (similar to operation 304), receive the authentication credentials from the client device 102 (similar to operation 306) and verify the identity of the user (similar to operation 308). If the user fails the re-authentication verification, the security engine 206 may update the authentication status to "not authenticated" or "not verified" and may even interface with the metaverse to automatically log off the user profile from the metaverse and/or send an alert to the client device 102 indicating that potentially fraudulent activity was identified.

Figure 4:
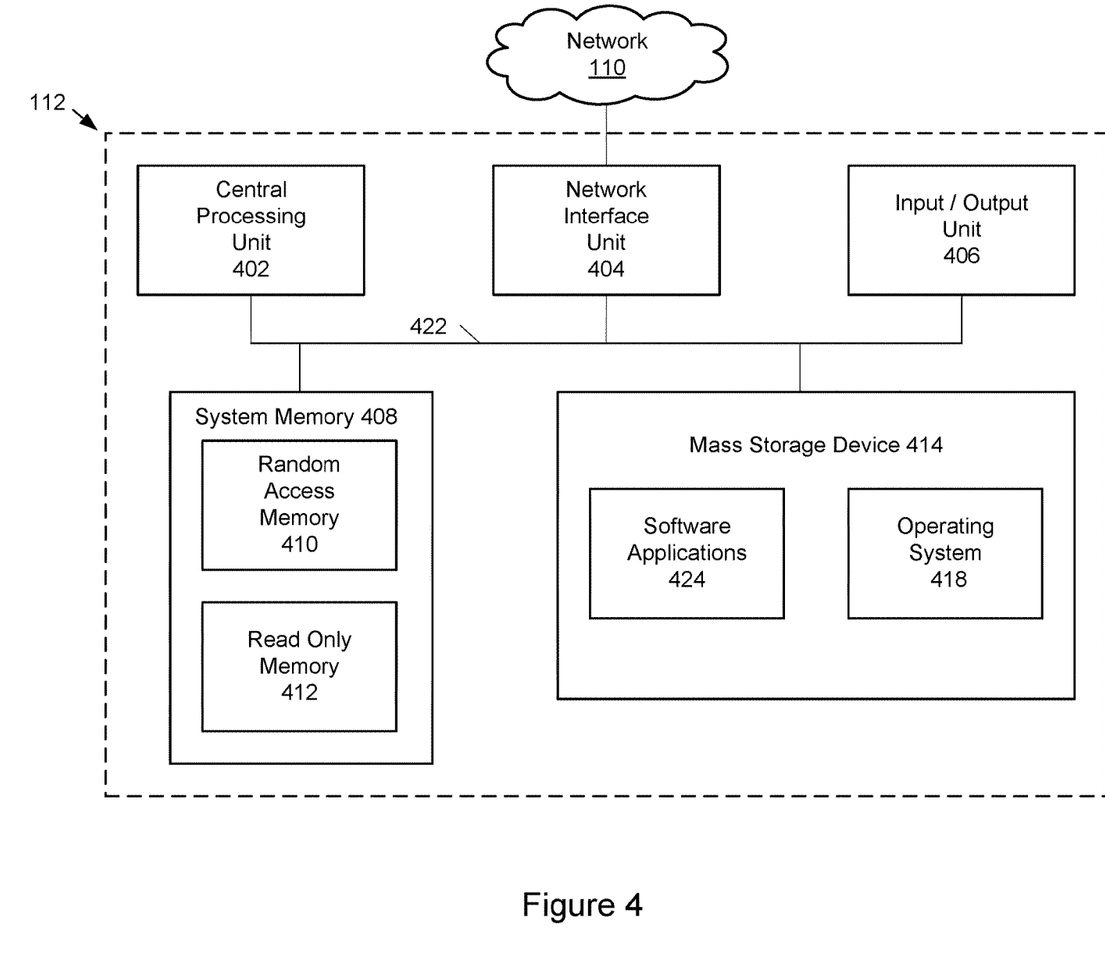
FIG. 4 shows example physical components of the server device of FIG. 2.

As illustrated in the embodiment of FIG. 4, the example server device 112, which provides the functionality described herein, can include at least one central processing unit ("CPU") 402, a system memory 408, and a system bus 422 that couples the system memory 408 to the CPU 402.

The system memory 408 includes a random access memory ("RAM") 410 and a read-only memory ("ROM") 412. A basic input/output system containing the basic routines that help transfer information between elements within the server device 112, such as during startup, is stored in the ROM 412. The server device 112 further includes a mass storage device 414. The mass storage device 414 can store software instructions and data. A central processing unit, system memory, and mass storage device similar to that shown can also be included in the other computing devices disclosed herein.

The mass storage device 414 is connected to the CPU 402 through a mass storage controller (not shown) connected to the system bus 422. The mass storage device 414 and its associated computer-readable data storage media provide non-volatile, non-transitory storage for the server device 112. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server device 112.

According to various embodiments of the invention, the server device 112 may operate in a networked environment using logical connections to remote network devices through network 110, such as a wireless network, the Internet, or another type of network. The server device 112 may connect to network 110 through a network interface unit 404 connected to the system bus 422. It should be appreciated that the network interface unit 404 may also be utilized to connect to other types of networks and remote computing systems. The server device 112 also includes an input/output controller 406 for receiving and processing input from a number of other devices, including a touch user interface display screen or another type of input device. Similarly, the input/output controller 406 may provide output to a touch user interface display screen or other output devices.

As mentioned briefly above, the mass storage device 414 and the RAM 410 of the server device 112 can store software instructions and data. The software instructions include an operating system 418 suitable for controlling the operation of the server device 112. The mass storage device 414 and/or the RAM 410 also store software instructions and applications 424, that when executed by the CPU 402, cause the server device 112 to provide the functionality of the server device 112 discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer system for authenticating a user in a metaverse, the computer system comprising:
one or more processors; and
non-transitory computer-readable storage media encoding instructions which, when executed by the one or more processors, cause the computer system to:
receive an authentication credential from the user;
determine whether the authentication credential is valid;
upon determining that the authentication credential is valid, update authentication status of the user;
upon determining that the user has enabled an option to visually display the authentication status, display a visual indicator adjacent to an avatar associated with a user profile within the metaverse, wherein the visual indicator represents the authentication status;
maintain the authentication status of the user across multiple login attempts by the user;
monitor for outlier behavior associated with the user profile of the user across multiple metaverses;
detect, as the outlier behavior, whether multiple avatars associated with the user profile are participating in interactions within the metaverse or different metaverses within a predetermined time interval, wherein the interactions include financial transactions associated with the user profile;
upon identifying the outlier behavior:
automatically log out the user profile from the metaverse;
update the visual indicator associated with the avatar indicating the authentication status of the user profile; and
trigger a heightened authentication process requiring more authentication factors than were initially required;
require re-authentication of the user profile in the metaverse using the heightened authentication process; and
send an alert to a client device associated with the user to notify of potential impersonation.

2. The computer system of claim 1, wherein the authentication status is maintained by a third party.

3. The computer system of claim 2, wherein the third party is a trusted entity in the metaverse.

4. The computer system of claim 1, comprising further instructions which, when executed by the one or more processors, causes the computer system to provide additional authentication to mitigate against impersonation of the user.

5. The computer system of claim 4, comprising further instructions which, when executed by the one or more processors, causes the computer system to:
trigger a trusted entity to perform the heightened authentication process.

6. The computer system of claim 1, wherein the visual indicator is a halo that is displayed around a head of the avatar.

7. The computer system of claim 1, wherein updating the authentication credential of the user includes:
determining whether the user has disabled the option to visually display the authentication status; and
upon determining that the user has disabled the option to visually display the authentication status, removing display of the visual indicator adjacent to the avatar associated with the user within the metaverse.

8. A method for authenticating a user in a metaverse, the method comprising:
receiving an authentication credential from the user;
determining whether the authentication credential is valid;
upon determining that the authentication credential is valid, updating authentication status of the user;
upon determining that the user has enabled an option to visually display the authentication status, displaying a visual indicator adjacent to an avatar associated with a user profile within the metaverse, wherein the visual indicator represents the authentication status;
maintaining the authentication status of the user across multiple login attempts by the user;
monitoring for outlier behavior associated with the user profile of the user across multiple metaverses;
detecting, as the outlier behavior, whether multiple avatars associated with the user profile are participating in interactions within the metaverse or different metaverses within a predetermined time interval, wherein the interactions include financial transactions associated with the user profile;
upon identifying the outlier behavior:
automatically logging out the user profile from the metaverse;
updating the visual indicator associated with the avatar indicating the authentication status of the user profile; and
triggering a heightened authentication process requiring more authentication factors than were initially required;
requiring re-authentication of the user profile in the metaverse using the heightened authentication process; and
sending an alert to a client device associated with the user to notify of potential impersonation.

9. The method of claim 8, wherein the authentication status is maintained by a third party.

10. The method of claim 9, wherein the third party is a trusted entity in the metaverse.

11. The method of claim 8, further comprising providing additional authentication to mitigate against impersonation of the user.

12. The method of claim 11, further comprising:
triggering a trusted entity to perform a heightened authentication process.

13. The method of claim 8, wherein updating the authentication credential of the user includes:
determining whether the user has disabled the option to visually display the authentication status; and
upon determining that the user has disabled the option to visually display the authentication status, removing display of the visual indicator adjacent to the avatar associated with the user within the metaverse.

14. A computer system for authenticating a user in a metaverse, the computer system comprising:
one or more processors; and
non-transitory computer-readable storage media encoding instructions which, when executed by the one or more processors, cause the computer system to:
receive an authentication credential from the user;
determine whether the authentication credential is valid;
upon determining that the authentication credential is valid, update authentication status of the user;
upon determining that the user has enabled an option to visually display the authentication status, display a visual indicator adjacent to an avatar associated with a user profile within the metaverse, wherein the visual indicator represents the authentication status;

maintain, using a trusted entity within the metaverse, the authentication status of the user across multiple login attempts by the user, wherein maintaining the authentication status includes continuously monitoring for outlier behavior associated with the user profile of the user across the metaverse;

detect, as the outlier behavior, whether multiple avatars associated with the user profile are participating in interactions within the metaverse or different metaverses within a predetermined time interval, wherein the interactions include financial transactions associated with the user profile;

upon identifying the outlier behavior associated with the user within the metaverse;

automatically log out the user profile from the metaverse;

update the visual indicator associated with the avatar indicating the authentication status of the user profile; and     trigger the trusted entity to perform a heightened authentication process requiring more authentication factors than were initially required;

require re-authentication of the user profile in the metaverse using the heightened authentication process; and send an alert to a client device associated with the user to notify of potential impersonation.

* * * * *

UNITED STATES PATENT AND TRADEMARK OFFICE
CERTIFICATE OF CORRECTION

| | | |
|---|---|---|
| PATENT NO. | : 12,278,902 B1 | Page 1 of 1 |
| APPLICATION NO. | : 18/149900 | |
| DATED | : April 15, 2025 | |
| INVENTOR(S) | : Dave et al. | |

It is certified that error appears in the above-identified patent and that said Letters Patent is hereby corrected as shown below:

In the Claims

Column 13, Line 16, Claim 14: delete "metaverse;" and insert --metaverse:--

Signed and Sealed this
Twenty-ninth Day of July, 2025

Coke Morgan Stewart
*Acting Director of the United States Patent and Trademark Office*